(12) United States Patent
Ehara et al.

(10) Patent No.: US 8,223,275 B2
(45) Date of Patent: Jul. 17, 2012

(54) PROJECTOR AND CORRECTION METHOD

(75) Inventors: Shinji Ehara, Oita (JP); Tadanori Aruga, Beppu (JP); Hiromasa Yamada, Beppu (JP); Kenji Tanaka, Beppu (JP); Hiroyuki Akahane, Beppu (JP); Masaki Uemori, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 1365 days.

(21) Appl. No.: 11/842,517

(22) Filed: Aug. 21, 2007

(65) Prior Publication Data

US 2008/0079854 A1    Apr. 3, 2008

(30) Foreign Application Priority Data

Sep. 29, 2006  (JP) .................................. 2006-267442

(51) Int. Cl.
- *H04N 3/23* (2006.01)
- *H04N 3/26* (2006.01)
- *H04N 3/223* (2006.01)
- *H04N 17/00* (2006.01)

(52) U.S. Cl. ........ 348/746; 348/745; 348/747; 348/177; 348/180; 348/189

(58) Field of Classification Search .......... 348/744–747, 348/180, 189, 191; 353/69–70
See application file for complete search history.

(56) References Cited

U.S. PATENT DOCUMENTS

2003/0189675 A1* 10/2003 Itaki .............................. 348/745

FOREIGN PATENT DOCUMENTS

| JP | A 2003-304552 | 10/2003 |
| JP | A-2005-033686 | 2/2005 |

\* cited by examiner

*Primary Examiner* — Brian Pendleton
*Assistant Examiner* — Jason Lin
(74) *Attorney, Agent, or Firm* — Oliff & Berridge, PLC

(57) ABSTRACT

A projector includes a projecting unit that projects a calibration image containing a plurality of types of pattern images having different shapes, a storing unit that stores correction data showing a correction value for each of the pattern images, a selecting unit that receives selection of a pattern image selected by a user from the pattern images, and a correcting unit that corrects distortion of an image projected by the projecting unit based on the correction value corresponding to the selection.

5 Claims, 4 Drawing Sheets

PROJECTOR AND CORRECTION METHOD

The entire disclosure of Japanese Patent Application No. 2006-267442, filed Sep. 29, 2006 is expressly incorporated by reference herein.

BACKGROUND OF THE INVENTION

The present invention relates to a projector and a correction method for correcting distortion of an image.

According to a method currently proposed for correcting distortion of a projection image, four corners of the projection image are specified by a user for executing correction of the distortion.

According to a method disclosed in JP-A-2003-304552, for example, correction points are established at four corners of a projection image for correcting distortion of the projection image. Then, the correction points are shifted according to a command given by a user, and the projection image is corrected based on correction parameters corresponding to the shift distance.

However, this method requires troublesome operation. Particularly when the distortion of the projection image is large, it is necessary for the user to individually shift three correction points to desired positions. In this case, further time and labor are needed.

SUMMARY

An advantage of some aspects of the invention is to provide a projector and a correction method capable of correcting distortion of a projection image more easily by operation from a user.

A projector according to an aspect of the invention includes a projecting unit that projects a calibration image containing a plurality of types of pattern images having different shapes, a storing unit that stores correction data showing a correction value for each of the pattern images, a selecting unit that receives selection of a pattern image selected by a user from the pattern images, and a correcting unit that corrects distortion of an image projected by the protecting unit based on, the correction value corresponding to the selection.

A correction method for correcting distortion of a projection image produced by a projector according to another aspect of the invention includes projecting a calibration image containing a plurality of types of pattern images having different shapes, receiving selection of a pattern image selected by the user from the pattern images, and correcting distortion of an image projected in the projecting step based on correction data corresponding to the selection. The projector repeats the projecting step, the receiving step, and the correcting step until correction of the image distortion is completed.

In this case, the user can correct distortion of the projection image only by selecting the pattern image. Since troublesome operation such as shifting operation is not needed, the user can more easily correct distortion of the projection image.

It is preferable that the calibration image has the eight pattern images which are disposed at upper and lower, left and right, and diagonal positions and has trapezoidal shapes whose widths decrease toward the center, and that the calibration image is an image used for selecting a pattern image having a shape closest to an image shape desired by the user.

In this case, the projector uses plurality of types of the pattern images having shapes corresponding to the distorted image shapes. Thus, the user can visually and easily select the pattern image having the shape closest to the desired image shape. Accordingly, simplification of the correction further increases.

It is preferable that the projecting unit projects the calibration image whose distortion has been corrected by the correcting unit, that the selecting unit receives the selection plural times, and that the correcting unit decreases the correction quantity of the distortion correction as the number of times the selecting unit receives the selection increases.

In this case, the projector gradually decreases the correction quantity, and thus prevents prolongation of the correction time caused due to excessive correction. Thus, the user can complete the correction in a shorter time.

It is preferable that the calibration image contains the pattern image having the desired image shape and positioned at the center, and that the correcting unit ends correction when the pattern image positioned at the center is selected.

In this case, the user ends the correction process when the pattern image positioned at the center becomes the desired shape. Thus, the user can visually and easily select the pattern image having the shape closest to the desired image shape. Accordingly, simplification of the correction further increases.

BRIEF DESCRIPTION OF THE DRAWINGS

The invention will be described with reference to the accompanying drawings, wherein like numbers refer to like elements.

DESCRIPTION OF EXEMPLARY EMBODIMENT

A projector according to an embodiment of the invention is hereinafter described with reference to the drawings. Obviously, the scope of the invention defined by the appended claims should not be limited by the particular embodiment described and depicted herein. It is further understood that all specific constructions described herein are not always required as resolutions for providing the scope of the invention defined by the appended claims.

Figure 1:
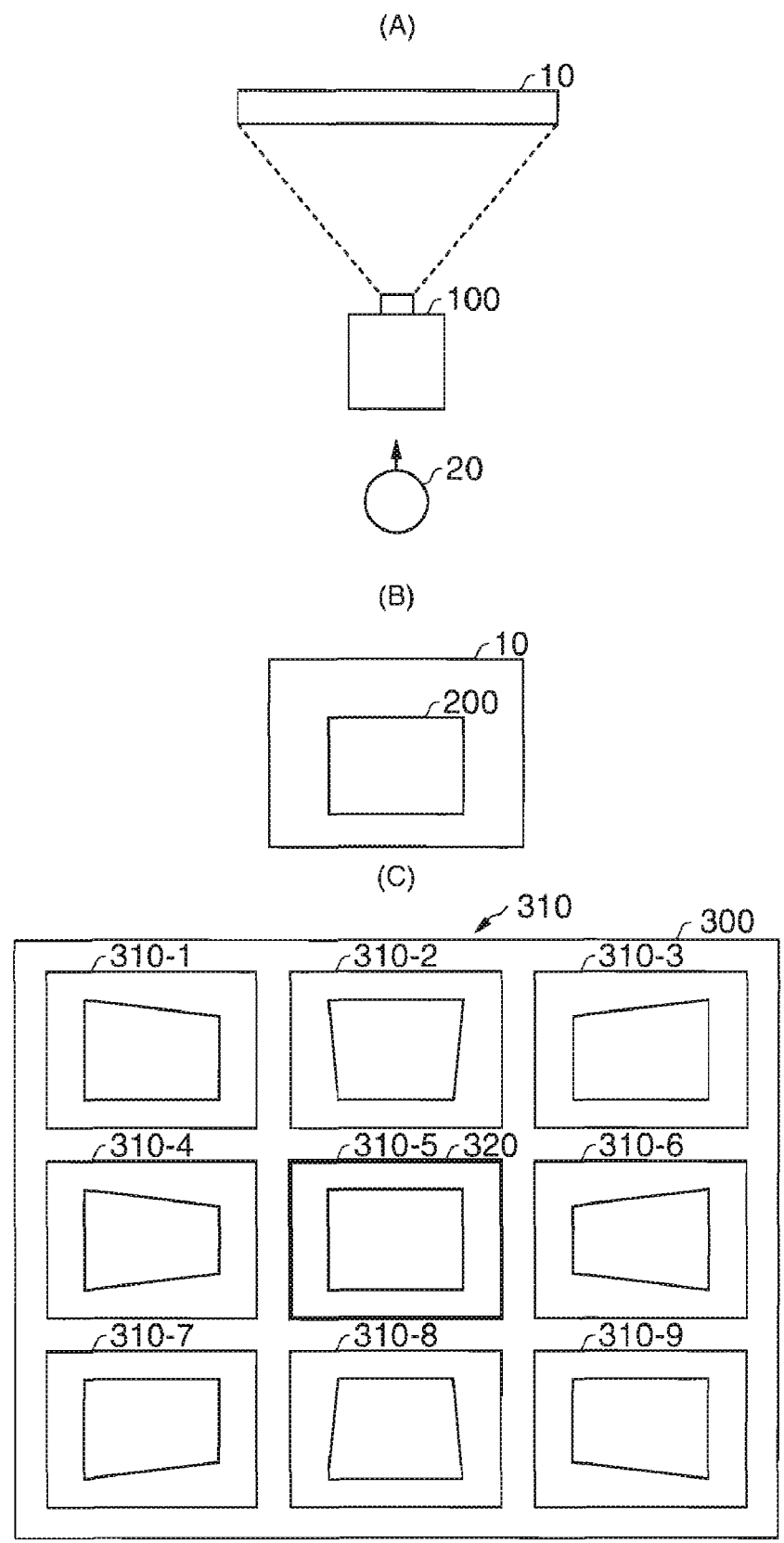
FIG. 1A is a schematic view showing an arrangement of a screen, a projector, and a user when a projection image is not distorted.
FIG. 1B is a view illustrative of the projection image viewed by the user under the condition shown in FIG. 1A.
FIG. 1C is a view illustrative of an example of a pattern image under the condition shown in FIG. 1A.

FIG. 1A is a schematic view showing an arrangement of a screen 10, a projector 100, and a user 20 when a projection image 200 is not distorted. FIG. 1B is a view illustrative of the projection image 200 viewed by the user 20 under the condition shown in FIG. 1A. FIG. 1C is a view illustrative of an example of a calibration image 300 under the condition shown in FIG. 1A.

For example, it is assumed that the projector 100 projects an image from the front of the screen 10, and that the user 20 observes the image from the front of the screen 10 as illustrated in FIG. 1A. In this case, the projection image 200 on the screen 10 (image projected by the projector 100) is not distorted but can be displayed with a shape desired by the user as illustrated in FIG. 1B.

The calibration image 300 used for correcting distortion of the project on image 200 according to this embodiment is now discussed.

As illustrated in FIG. 1C, the calibration image 300 contains nine pattern images 310-1 through 310-9 having different shapes at the center, upper and lower; left and right, and diagonal positions. For example, the pattern image 310-5 at the center position has the desired shape (rectangular shape in this embodiment), and the other Pattern images 310-1 through 310-4, and 310-6 through 310-9 have trapezoidal shapes whose widths decrease toward the center.

The calibration image 300 includes a cursor image 320 which selects a pattern image having the shape closest to the desired image shape for the eyes of the user 20. The user 20 shifts the cursor image 320 to each of the pattern images 310-1 through 310-9 by operating a remote controller of the projector 100 or an operation button of an operation panel provided on the projector 100. Then, the user 20 selects a pattern image 310 having the shape closest to the desired shape for the eyes of the user 20 by shifting the cursor image 320, and pushes a determination button of the remote controller or the like.

By this step, the projector 100 recognizes the shape of the projection image 200 viewed by the user 20

The case of the projection image 200 having distortion is now discussed.

Figure 2:
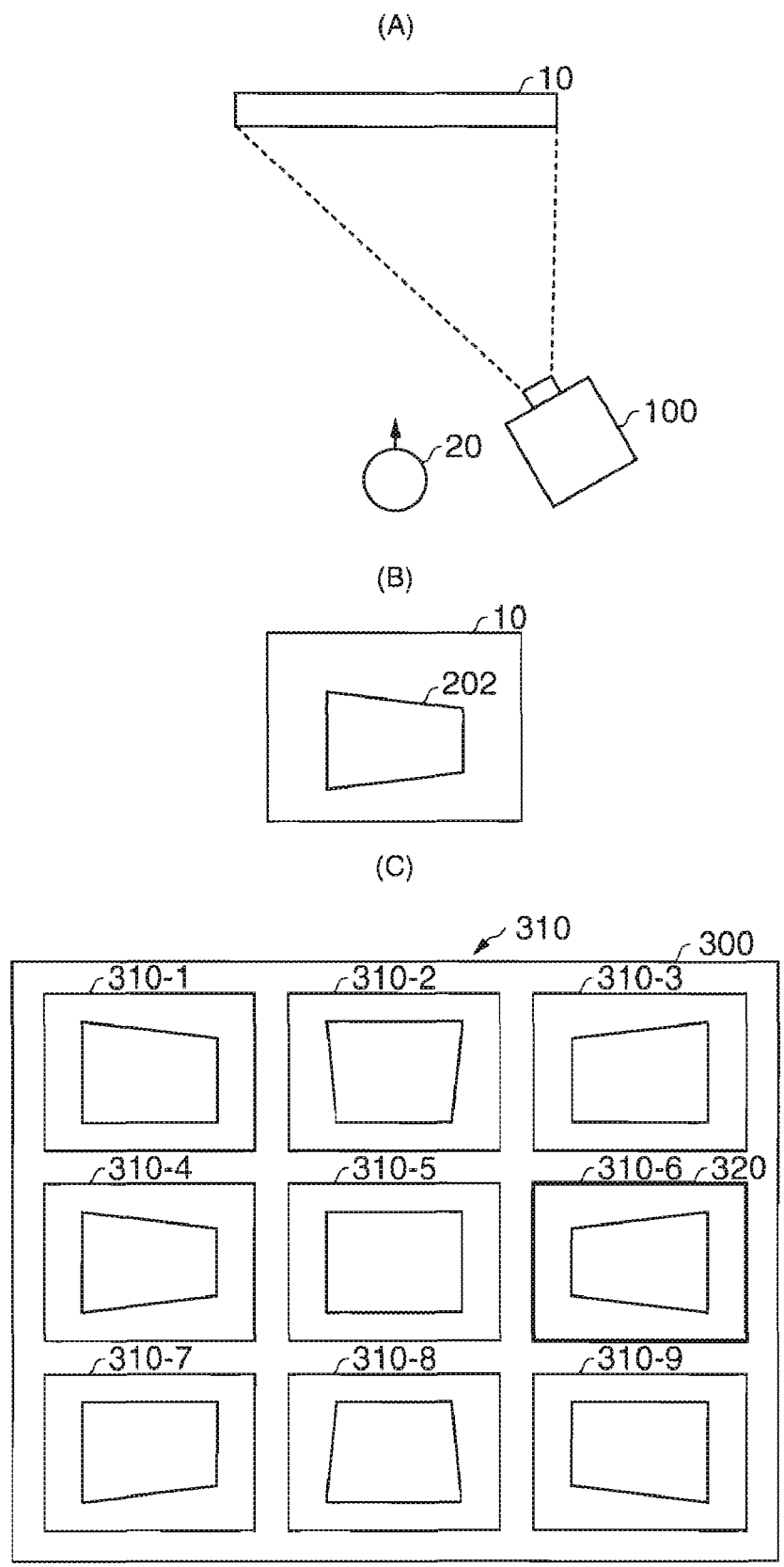
FIG. 2A is a schematic view showing an arrangement of the screen, the projector, and the user when a projection image is distorted.
FIG. 2B is a view illustrative of the protection image viewed by the user under the condition shown in FIG. 2A.
FIG. 2C is a view illustrative of an example of a pattern image under the condition shown in FIG. 2A.

FIG. 2A is a schematic view showing an arrangement of the screen 10, projector 100, and user 20 when a projection image 202 is distorted. FIG. 2B is a view illustrative of the projection image 202 viewed by the user 20 under the condition shown in FIG. 2A. FIG. 2C is a view illustrative of an example of the calibration image 300 under the condition shorn in FIG. 2A.

For example, it is assumed that the projector 100 projects an image from a position shifted to the right from the front of the screen 10, and that the user 20 observes the image from the front of the screen 10 as illustrated in FIG. 2A. In this case, the shape of the projection image 202 on the screen 10 is distorted into a trapezoidal shape having the longer left side than the right side as illustrated in FIG. 2B.

Under the condition of FIG. 2A, the pattern image 310*6* which has a trapezoidal shape having the longer right side than the left side when viewed from the front appears to be a rectangular shape on the calibration image 300. FIG. 2C is a schematic view showing the calibration image 300 without distortion, but actually the calibration image 300 has distortion similarly to the projection image 202.

In this case, the user 20 selects the pattern image 310-6 having the rectangular shape for the eyes of the user by using the cursor image 320, and pushes the determination button.

By this step, the projector 100 recognizes the shape of the projection image 202 viewed by the user 20.

A function block of the projector 100 having a function for correcting the distortion of the projection image 202 by using the calibration image 300 is now discussed.

Figure 3:
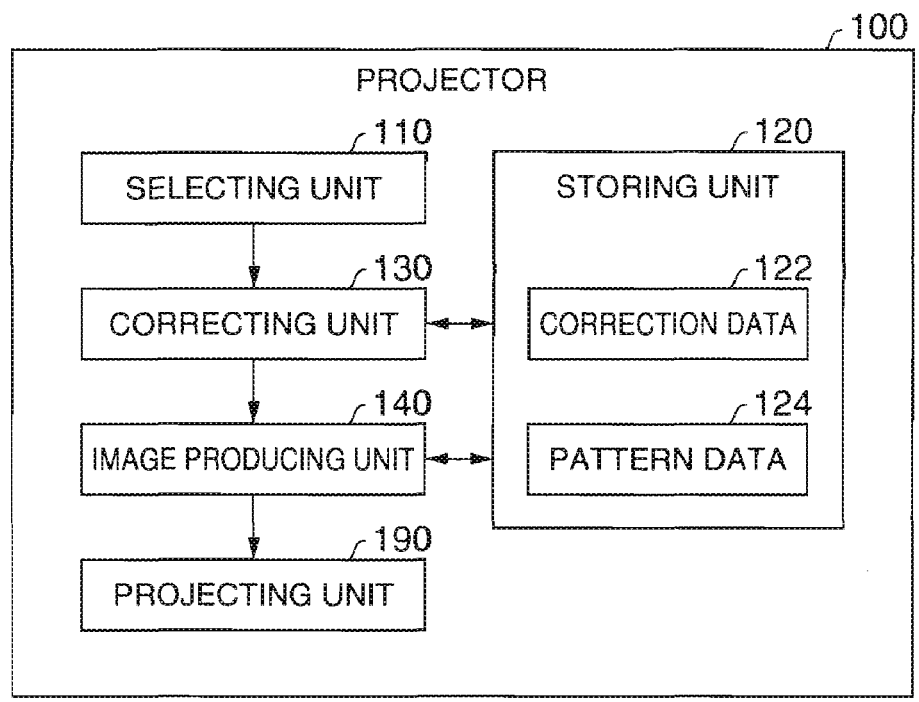
FIG. 3 is a block diagram showing a function of the projector according to an embodiment.

FIG. 3 is a block diagram showing a function block of the projector 100 according to this embodiment.

The projector 100 includes an image producing unit 140 for producing the calibration image 300 and others, a projection unit 190 for projecting the calibration image 300 and others, a storing unit 120 for storing various types of data, a selecting unit 110 for receiving selection from the calibration image 300 determined by the user 20, and a correcting unit 130 for correcting distortion of an image projected by the projecting unit 190 based on a correction value of correction data 122 corresponding to the selection.

The storing unit 120 stores the correction data 122 slowing correction values for the respective pattern images, pattern data 124 used for producing the calibration image 300, and other data.

More specifically, the correction data 122 contains a correction value for correcting the projection image 202 such that the projection image 202 has a reverse shape of that of the pattern image 310 for each of the pattern images 310 (excluding the pattern image 310-5), for example.

These functions may be performed by the following hardware instead of using the above units.

Figure 4:
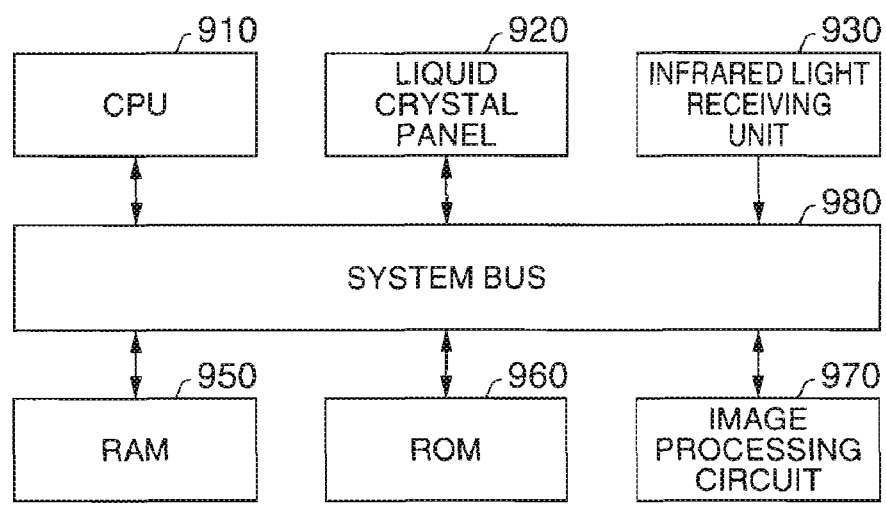
FIG. 4 is a block diagram showing hardware of the projector according to the embodiment.

FIG. 4 is a block diagram showing hardware of the projector 100 according to this embodiment.

For example, components such as an infrared light receiving unit 930 for receiving infrared light from a remote controller may be used as the selecting unit 110. Components such as a RAM 950 and a ROM 960 may be used as the storing unit 120. Components such as a CPU 910 and an image processing circuit 970 may be used as the correcting unit 130 and the image producing unit 140. Components such as a liquid crystal panel 920 may be used as the projecting unit 190. These components can mutually exchange information via a system bus 980.

A distortion correcting process for correcting distortion of the projection image 202 is now explained.

Figure 5:
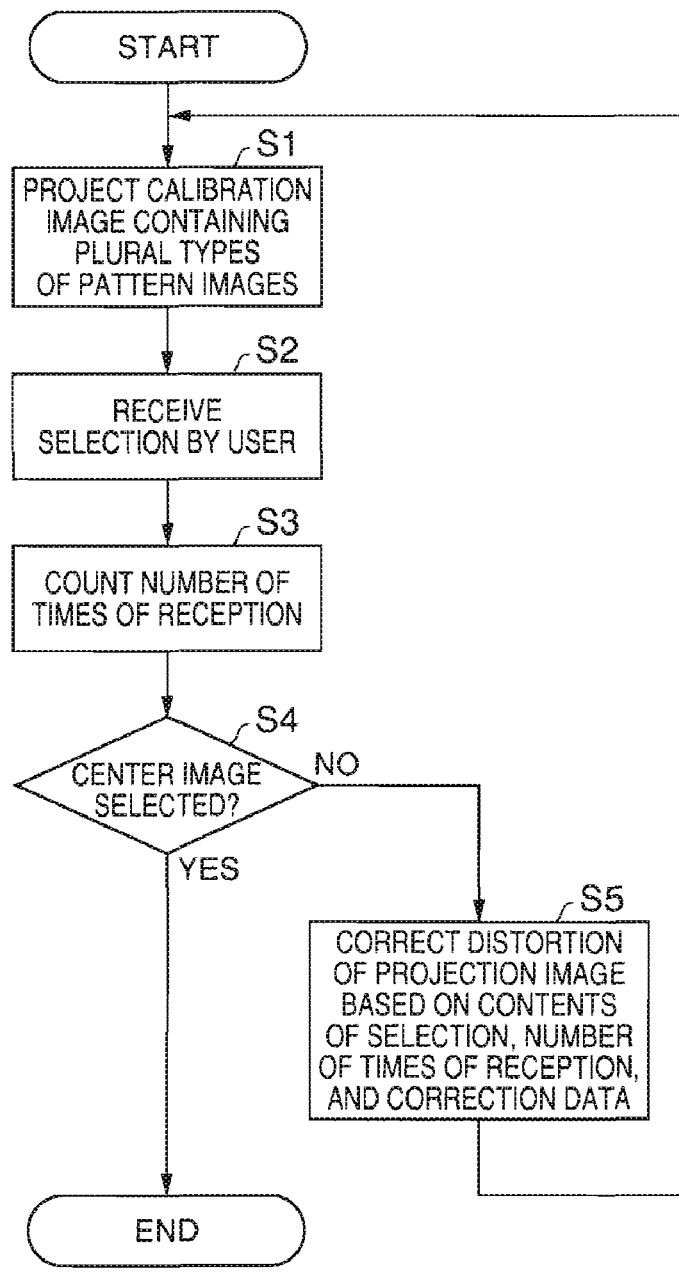
FIG. 5 is a flowchart showing a process for correcting distortion according to the embodiment.

FIG. 5 is a flowchart showing the distortion correcting process according to this embodiment.

When operation information indicating a distortion correction command is inputted by the user 20 through the selecting unit 110, for example, the image producing unit 140 projects the calibration image 300 based on the pattern data 124 (step S1).

The user 20 selects the pattern image 310 which has the shape closest to the rectangular shape for the eyes of the user 20 from the pattern images 310-1 through 310-9, and the selecting unit 110 receives this selection (step S2). More specifically, the selecting unit 110 inputs operation information received from the remote controller, for example.

Then, the correcting unit 130 counts the number of times the selecting unit 110 receives the selection from start of the correction (step S3).

The correcting unit 130 further recognizes which position of the pattern image 310 has been selected based on the operation information from the user 20 inputted by the selecting unit 110, and judges whether the pattern image 310-5 positioned at the center has been selected (step S4).

When it is determined that the pattern image 310-5 positioned at the center has been selected, that is when the calibration image 300 appears to be a substantially rectangular shape, the projector 100 ends the correction.

When it is determined that any of the pattern images other than the pattern image 310-5 positioned at the center has been selected, the correcting unit 130 corrects distortion of the projection image 202 based on the contents of selection, the number of times of reception, and the correction data 122 (step S5). More specifically, the correcting unit 130 recognizes which pattern image 310 has been selected based on the selection information. Then, the correcting unit 130 searches in the correction data 1212 for the correction value corresponding to the selected pattern image 310, and controls the image producing unit 140 based on the obtained correction value after adjustment according to the number of times of reception.

Adjustment of the correction value according to the number of times of reception may be performed by a method which calculates (correction value×1)/(number of times of correction) to adjust the value. According to this method, the distortion correction quantity decreases as the number of times the selection is received increases.

Then, the projector 100 repeats the steps S1 through S5 until the pattern image 310-5 positioned at the center is selected.

According to this embodiment, therefore, the user 20 can correct distortion of the projection image 202 only by selecting the pattern image 310. Since troublesome operation such as shifting operation is not needed, the user 20 can more easily correct distortion of the projection image 202.

According to this embodiment, the projector 100 gradually decreases the correction quantity as the number of times of correction for one calibration process increases. As a result, the projector 100 can prevent prolongation of the correction time caused due to excessive correction. Thus, the user 20 can complete the correction process in a shorter time.

According to this embodiment, the projector 100 uses images having trapezoidal shapes deformed from the original rectangular shape according to the positions as the pattern images 310. Thus, the user 20 can visually and easily select the pattern image 310 having the shape closest to the desired image shape. Accordingly, simplification of the correction process further increases.

According to this embodiment, the user 20 ends the correction process when the pattern image 310-5 positioned at the center becomes the desired shape. Thus, the user 20 can visually and easily select the pattern image 310 having the shape closest to the desired image shape. Accordingly, simplification of the correction further increases.

It is intended that the invention is not limited to the particular embodiment described and depicted herein, and that various changes and modifications may be made.

For example, while the correction by the projector 100 is ended based on the selection of the pattern image 310-5 in this embodiment, the correction may be ended based on operation of a button indicating correction end by the user 20 or on other occasions.

The arrangement and the number of the pattern images 310 are not limited to those shown in FIG. 1C. The number of the pattern images 310 may be 8 or smaller, or 10 or larger, for example. The arrangement of the pattern images 310 may include four images located only at the upper and lower positions and the left and right positions, four images located only at the diagonal positions, sixteen images positioned along the sides of the calibration image 300, or images in other positions.

The shapes of the respective pattern images 310 are not limited to the trapezoidal shapes, but may be elliptical shapes when the desired image shape is round.

While selection of the pattern image 310 is inputted using the cursor image 320 in this embodiment, the selection of the pattern image 310 may be inputted by other methods such as operation of a combination of direction keys and the determination button of the remote controller by the user 20 or operation of numerical buttons of the remote controller by the user 20.

The image producing unit 140 may produce an image containing a series of characters saying "select pattern closest to rectangular shape", for example, as the calibration image 300 and request the user 20 to select the pattern image 310 closest to the desired image shape.

The image producing unit 140 may produce the calibration image 300 as an OSD (on screen display) image.

The projector 110 is not limited to the liquid crystal projector, but may be a projector including a DMD (digital micro-mirror device) developed by the U.S. Texas Instruments Inc., a CRT (cathode ray tube) projector, a projector including organic EL (electro luminescence), or other projectors.

What is claimed is:

1. A projector, comprising:
 a projecting unit that projects a calibration image containing a plurality of types of pattern images having different shapes;
 a storing unit that stores correction data showing a correction value for each of the pattern images;
 a selecting unit that receives selection of a pattern image selected by a user from the pattern images; and
 a correcting unit that corrects distortion of an image projected by the projecting unit based on the correction value corresponding to the selection,
 wherein the calibration image has eight pattern images which are disposed at upper and lower, left and right, and diagonal positions and has trapezoidal shapes whose widths decrease toward the center of the calibration image.

2. The projector according to claim 1, wherein:
 the calibration image is an image used for selecting a pattern image having a shape closest to an image shape desired by the user.

3. The projector according to claim 1, wherein:
 the projecting unit projects the calibration image whose distortion has been corrected by the correcting unit;
 the selecting unit receives the selection plural times; and
 the correcting unit decreases the correction quantity of the distortion correction as the number of times the selecting unit receives the selection increases.

4. The projector according to claim 3, wherein:
 the calibration image contains the pattern image having the desired image shape and positioned at the center; and
 the correcting unit ends correction when the pattern image positioned at the center is selected.

5. A correction method for correcting distortion of a projection image produced by a projector, comprising:
 projecting a calibration image containing a plurality of types of pattern images having different shapes;
 receiving selection of a pattern image selected by the user from the pattern images; and
 correcting distortion of an image projected in the projecting step based on correction data corresponding to the selection,
 wherein the projector repeats projecting, receiving, and correcting until correction of the image distortion is completed, and
 the calibration image has eight pattern images which are disposed at upper and lower, left and right, and diagonal positions and has trapezoidal shapes whose widths decrease toward the center of the calibration image.

* * * * *